UNITED STATES PATENT OFFICE 2,643,258

SUBSTITUTED SUCCINIMIDES

Charles A. Miller, Detroit, and Loren M. Long, Grosse Pointe Woods, Mich., assignors to Parke, Davis & Company, Detroit, Mich., a corporation of Michigan No Drawing. Application April 12, 1950, Serial No. 155,563

4 Claims. (Cl. 260—326.5)

This invention relates to two new substituted succinimides which possess a remarkably high order of a particularly valuable type of anticonvulsant activity. More particularly, the invention relates to N-methyl and N-allyl-α-phenyl succinimides. These new products can be represented by the formula,

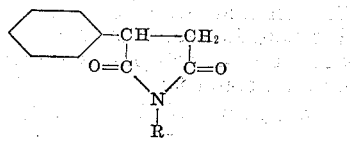

where R is a methyl or allyl radical.

In accordance with the invention these succinimides are prepared by the reaction of phenyl succinic acid or anhydride with methyl or allyl amine. When the acid is employed the intermediate reaction product is the di-salt of the acid and amine. This salt upon heating, preferably at about 200–250°, dehydrates to yield the desired N-substituted succinimide. When phenyl succinic anhydride is used as the starting material, the intermediate reaction product is the half amide, that is, β-N-methyl or allyl-phenylsuccinamic acid. This half amide upon heating, preferably in the presence of a dehydrating agent, undergoes dehydration to yield the corresponding N-substituted succinimide. As dehydrating agents acetyl chloride, acetic anhydride and the like can be used. These transformations can be illustrated as follows:

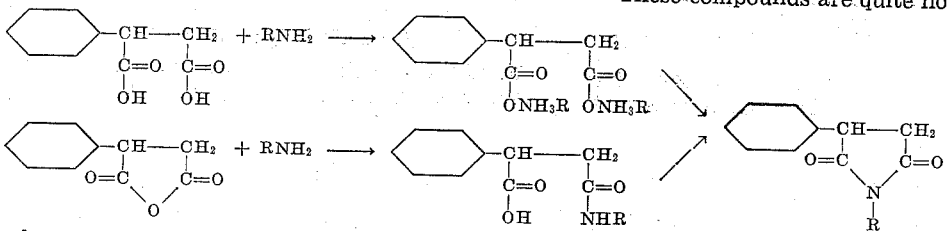

where R is a methyl or allyl radical.

The products of the invention are particularly useful in the treatment of the petit mal type of epileptic seizures. They are unique in that they are highly effective against this type of convulsion without the production of the undesirable hypnotic effects usually associated with other anticonvulsants. The products are also of value in the treatment of the grand mal type of epileptic seizures.

When tested by the standard electro-shock methods of Putnam et al. (Science, 85, 525 (1937)) utilizing cats and that of Toman et al. (J. Neurophysiol., 9, 231 (1946)) utilizing mice, the products of the invention exhibit a high degree of anticonvulsant activity as shown in the table. As will also be seen from the table the products of the invention show a high degree of activity in the so-called "Anti-metrazol test" for the petit mal type of convulsion. This test is performed by feeding five rats weighing 150–200 g. a predetermined quantity of the drug to be tested, followed in one-half hour by the subcutaneous injection of 93 mg./kg. (95–100% of the convulsive dose) of Metrazol (pentamethylene tetrazole). The rating of the drug is based on the number of the five rats which are protected from convulsions within the half hour following the injection of the Metrazol, a 4+ rating indicating the protection of all five animals.

Table

| R | Electro-shock, Cat Test | | Electro-shock, Mouse Test—Dose of Drug (mg./kg.) which protects 50% of the test mice from convulsions | Anti-Metrazol Test | |
|---|---|---|---|---|---|
| | Rating | Dose Level, mg./kg. | | Rating | Dose Level of Drug, mg./kg. |
| Methyl | 4+ | 200 | 255±8 | 4+ | 250 |
| | 1+ | 100 | | 4+ | 125 |
| Allyl | 4+ | 100 | 246±12 | 4+ | 125 |
| | 1+ | 50 | | 1+ | 65 |

These compounds are quite non-toxic. For example, N-allylphenylsuccinimide, has an M. T. D. (maximum tolerated dose) orally in mice of about 0.5 g./kg. and an LD$_{50}$ (lethal dose for 50% of animals) of 1.6 g./kg. The M. T. D. in mice for N-methylphenylsuccinimide is about 1.0 g./kg. and the LD$_{50}$ 2.07 g./kg. In general, these compounds are non-toxic, produce no cumulative toxic effect and have no toxic effect on the hemotopoietic system.

The invention is illustrated by the following examples:

Example 1

(a) 10 g. of phenylsuccinic anhydride is dissolved in 250 ml. of absolute ether and the solution is treated with dry methyl amine until a precipitate ceases to form. After standing for one-half hour the ether is decanted off and the residue is washed with 40 ml. of water by decantation. The mixture is filtered and the precipitate washed with 10 ml. of water. By acidification of the filtrate, a white precipitate is obtained. After drying it weighs 8 g. and melts at 136–40° C. The two precipitates are combined and recrystallized from aqueous alcohol to give β-N-methylphenylsuccinamic acid which melts at 158–60° C.

9 g. of β-N-methylphenylsuccinamic acid and 200 ml. of acetyl chloride are heated together on a steam bath for one half hour. The excess acetyl chloride is removed by distillation and 50 ml. of water are added to the thick residue. After allowing for hydrolysis of the excess acetyl chloride the water is decanted and the yellow residue dissolved in 75 ml. of ether. The resulting solution is treated with charcoal twice and dried over anhydrous magnesium sulfate. On partial evaporation of the ether a white solid precipitates. There is obtained 4 g. of N-methyl-α-phenylsuccinimide which melts at 71–73° C. and which has the following formula,

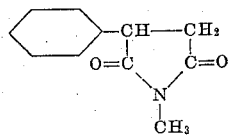

(b) 194 g. of phenylsuccinic acid is dissolved in a slight excess of aqueous methyl amine solution containing 40% of methyl amine. The water and excess amine are removed by distillation and the residue consisting of the neutral methyl amine salt of phenylsuccinic acid is decomposed by heating at 200–250° C. under reduced pressure of the water pump. After the evolution of methyl amine and water stops, the residue is cooled somewhat and dissolved in 300 ml. of glacial acetic acid, is charcoaled and then filtered. By the addition of 150 ml. of warm water the clear yellow solution gives fine crystals of N-methylphenylsuccinimide prepared in (a) above.

*Example 2*

9 g. of phenylsuccinic anhydride is dissolved in 200 ml. of absolute ether and the solution is treated dropwise with allyl amine until a precipitate fails to form. This process is accompanied by the evolution of considerable heat. The resulting mixture is allowed to stand for one-half hour after which the ether is decanted and the oily residue dissolved in 50 ml. of water. The resulting solution is filtered and then acidified with 6-N-hydrochloric acid whereupon solidification occurs upon standing overnight. The resulting solid is filtered and dried. After recrystallization from aqueous ethanol, the β-N-allylphenylsuccinamic acid melts at 94–96° C.

8 g. of β-N-allylphenylsuccinamic acid and 75 ml. of acetyl chloride are heated on the steam bath for one-half hour. The excess acetyl chloride is removed by distillation under reduced pressure. The oily residue is stirred and shaken with 20 ml. of water and cooled whereupon solidification occurs. The water is decanted and the residue dissolved in 60 ml. of ether. On cooling, white crystals are obtained which melt at 58–60° C. The N-allyl-α-phenylsuccinimide has the following formula,

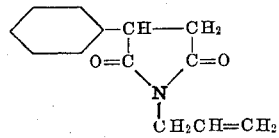

Attention is directed to a copending application filed September 26, 1952, Serial No. 311,798 which is in part a continuation of the instant application and which discloses related chemical compounds useful in the treatment of the petit mal type of epileptic seizures.

What we claim is:

1. A compound of the formula,

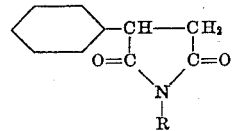

wherein R is a member of the class consisting of methyl and allyl radicals.

2. N-methyl-α-phenylsuccinimide.
3. N-allyl-α-phenylsuccinimide.
4. An anticonvulsant composition for treatment of the petit mal type of epileptic seizures comprising N-methyl-α-phenylsuccinimide.

CHARLES A. MILLER.
LOREN M. LONG.

References Cited in the file of this patent

FOREIGN PATENTS

| Number | Country | Date |
|---|---|---|
| 389,948 | Germany | Aug. 1, 1922 |

OTHER REFERENCES

Beilstein, Handbuch der Organischen Chemie, Vierte Auflauge, vol. 21, pages 373, 374 and 514.